United States Patent
Chu et al.

(10) Patent No.: US 7,904,946 B1
(45) Date of Patent: Mar. 8, 2011

(54) METHODS AND SYSTEMS FOR SECURE USER AUTHENTICATION

(75) Inventors: Ronald King-Hang Chu, Los Angeles, CA (US); Mark Kogen, Torrance, CA (US); Warren Tan, Thousand Oaks, CA (US); Simon Ma, Torrance, CA (US); Yosif Smushkovich, Santa Monica, CA (US); Gerry Glindro, Carson, CA (US); Jeffrey William Coyte Nicholas, Los Angeles, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 860 days.

(21) Appl. No.: 11/636,839

(22) Filed: Dec. 11, 2006

Related U.S. Application Data

(60) Provisional application No. 60/749,230, filed on Dec. 9, 2005, provisional application No. 60/784,970, filed on Mar. 22, 2006.

(51) Int. Cl.
    *H04L 29/00* (2006.01)
(52) U.S. Cl. .............. 726/5; 726/6; 726/7; 726/8; 726/9; 726/10
(58) Field of Classification Search .............. 726/5
    See application file for complete search history.

(56) References Cited

U.S. PATENT DOCUMENTS

| | | | |
|---|---|---|---|
| 4,599,489 A | 7/1986 | Cargile | 178/22.08 |
| 4,609,777 A | 9/1986 | Cargile | 178/22.08 |
| 4,800,590 A | 1/1989 | Vaughan | 380/25 |
| 4,819,267 A | 4/1989 | Cargile et al. | 380/23 |
| 5,280,527 A | 1/1994 | Gullman et al. | 380/23 |
| 5,363,448 A | 11/1994 | Koopman, Jr. et al. | 713/170 |
| 5,481,611 A | 1/1996 | Owens et al. | 380/25 |
| 5,657,388 A | 8/1997 | Weiss | 380/23 |
| 5,737,421 A | 4/1998 | Audebert | 380/23 |
| 5,802,176 A | 9/1998 | Audebert | 380/23 |
| 5,838,458 A | 11/1998 | Tsai | 358/402 |
| 5,887,065 A | 3/1999 | Audebert | 380/23 |
| 5,937,068 A | 8/1999 | Audebert | 380/23 |
| 6,044,154 A | 3/2000 | Kelly | 380/25 |
| 6,067,621 A | 5/2000 | Yu et al. | 713/172 |

(Continued)

FOREIGN PATENT DOCUMENTS

WO WO 2005/025292 3/2005

*Primary Examiner* — Nasser Moazzami
*Assistant Examiner* — Ghazal Shehni
(74) *Attorney, Agent, or Firm* — King & Spalding LLP

(57) ABSTRACT

Methods and systems for secure user authentication utilizes OTP generation and validation techniques in which the shared secret for generating the OTP is not stored in the user's mobile device but instead is dynamically synthesized based on a PIN that activates the OTP generation and the personalized OTP data. The client software has no knowledge of what the correct PIN should be and always generates a normal looking OTP based on whatever PIN is entered, and the only way to learn whether or not the OTP is correct is to submit it during user login. By limiting the number of failed login attempts before the account is locked, brute-force attacks via the online channel will fail, and further, brute-force attacks to uncover the correct PIN for generating the correct OTP offline will also fail even if a hacker steals the user's mobile device and extracts the data inside for offline hacking, because there is nothing on the client that contains the PIN or encrypted by the PIN.

2 Claims, 1 Drawing Sheet

U.S. PATENT DOCUMENTS

| | | |
|---|---|---|
| 6,173,400 B1 | 1/2001 | Perlman et al. ............... 713/172 |
| 6,266,413 B1 | 7/2001 | Shefi ............................. 380/46 |
| 6,317,838 B1 | 11/2001 | Baize ........................... 713/201 |
| 6,327,662 B1 | 12/2001 | Araujo ......................... 713/200 |
| 6,338,140 B1 | 1/2002 | Owens et al. ................. 713/168 |
| 6,343,361 B1 | 1/2002 | Nendell et al. ............... 713/171 |
| 6,445,794 B1 | 9/2002 | Shefi ............................. 380/46 |
| 6,480,958 B1 | 11/2002 | Harrington ................... 713/184 |
| 6,694,436 B1 | 2/2004 | Audebert ...................... 713/200 |
| 6,731,731 B1 | 5/2004 | Ueshima ....................... 379/196 |
| 6,732,278 B2 | 5/2004 | Baird, III et al. ............. 713/201 |
| 6,829,356 B1 | 12/2004 | Ford ............................... 380/44 |
| 6,880,079 B2 | 4/2005 | Kefford et al. ............... 713/155 |
| 6,904,526 B1 | 6/2005 | Hongwei ...................... 713/182 |
| 6,908,030 B2 | 6/2005 | Rajasekaran et al. ......... 235/379 |
| 6,928,558 B1 | 8/2005 | Allahwerdi et al. .......... 713/202 |
| 2001/0054148 A1 | 12/2001 | Hoornaert et al. ............ 713/172 |
| 2001/0055388 A1 | 12/2001 | Kaliski, Jr. ..................... 380/30 |
| 2002/0002678 A1 | 1/2002 | Chow et al. .................. 713/169 |
| 2002/0087860 A1 | 7/2002 | Kravitz ......................... 713/168 |
| 2002/0103765 A1 | 8/2002 | Ohmori ........................... 705/67 |
| 2002/0112156 A1 | 8/2002 | Gien et al. .................... 713/156 |
| 2002/0147930 A1 | 10/2002 | Pritchard et al. ............. 713/202 |
| 2002/0159601 A1* | 10/2002 | Bushmitch et al. ........... 380/277 |
| 2002/0166048 A1 | 11/2002 | Coulier ......................... 713/169 |
| 2002/0198848 A1 | 12/2002 | Michener ........................ 705/75 |
| 2003/0037262 A1 | 2/2003 | Hillhouse .................... 713/202 |
| 2003/0084304 A1 | 5/2003 | Hon et al. ..................... 713/185 |
| 2003/0112972 A1 | 6/2003 | Hattick et al. ................. 380/46 |
| 2003/0115154 A1 | 6/2003 | Anderson et al. .............. 705/73 |
| 2003/0152254 A1 | 8/2003 | Ha et al. ........................ 382/124 |
| 2003/0159068 A1 | 8/2003 | Halpin et al. ................. 713/201 |
| 2003/0163739 A1 | 8/2003 | Armington et al. ........... 713/202 |
| 2003/0191949 A1 | 10/2003 | Odagawa ...................... 713/186 |
| 2003/0208697 A1 | 11/2003 | Gardner ........................ 713/202 |
| 2003/0212894 A1 | 11/2003 | Buck et al. ................... 713/184 |
| 2004/0049685 A1* | 3/2004 | Jaloveczki .................... 713/182 |
| 2004/0059952 A1 | 3/2004 | Newport et al. .............. 713/202 |
| 2004/0097217 A1 | 5/2004 | McClain ....................... 455/411 |
| 2004/0103290 A1 | 5/2004 | Mankins ....................... 713/193 |
| 2004/0111520 A1 | 6/2004 | Krantz et al. ................. 709/229 |
| 2004/0139028 A1 | 7/2004 | Fishman et al. ................ 705/67 |
| 2004/0153668 A1 | 8/2004 | Baier Saip et al. ........... 713/201 |
| 2004/0172531 A1 | 9/2004 | Little et al. ................... 713/155 |
| 2004/0230807 A1 | 11/2004 | Baird, III et al. ............. 713/182 |
| 2004/0243856 A1 | 12/2004 | Shatford ....................... 713/202 |
| 2004/0255119 A1* | 12/2004 | Ukeda et al. .................. 713/169 |
| 2005/0015588 A1 | 1/2005 | Lin et al. ....................... 713/159 |
| 2005/0050330 A1 | 3/2005 | Agam et al. .................. 713/172 |
| 2005/0069137 A1 | 3/2005 | Landrock ...................... 380/278 |
| 2005/0097320 A1 | 5/2005 | Golan et al. .................. 713/166 |
| 2005/0149762 A1 | 7/2005 | Smith et al. ................... 713/202 |
| 2005/0154923 A1 | 7/2005 | Lok et al. ..................... 713/202 |
| 2005/0166263 A1 | 7/2005 | Nanopoulos et al. ............ 726/7 |
| 2005/0187873 A1 | 8/2005 | Labrou et al. ................... 705/40 |
| 2005/0188202 A1 | 8/2005 | Popp ............................. 713/175 |
| 2005/0191992 A1 | 9/2005 | Inoue et al. ................... 455/411 |
| 2005/0193198 A1 | 9/2005 | Livowsky ..................... 713/168 |
| 2005/0208891 A1 | 9/2005 | Khare et al. .................... 455/39 |
| 2005/0210252 A1 | 9/2005 | Freeman et al. .............. 713/171 |
| 2005/0273442 A1 | 12/2005 | Bennett et al. .................. 705/67 |
| 2006/0059344 A1 | 3/2006 | Mononen ...................... 713/171 |
| 2006/0287963 A1 | 12/2006 | Steeves et al. .................. 705/64 |
| 2007/0076866 A1 | 4/2007 | Vanstone et al. ................ 380/30 |

* cited by examiner

US 7,904,946 B1

METHODS AND SYSTEMS FOR SECURE USER AUTHENTICATION

PRIORITY APPLICATIONS

This application claims the benefit of U.S. Provisional Application No. 60/749,230 filed Dec. 9, 2005, entitled "METHODS AND SYSTEMS FOR SECURE USER AUTHENTICATION", and U.S. Provisional Application No. 60/784,970 filed Mar. 22, 2006, entitled "METHODS AND SYSTEMS FOR SECURE USER AUTHENTICATION", each of which is incorporated herein by this reference.

FIELD OF THE INVENTION

The present invention relates generally to the field of secure user authentication, and more particularly to the secure use of one time passwords (OTPs) for user authentication, for example, for mobile phone banking, online banking, and access to self-service financial transaction terminals, such as automated teller machines (ATMs), as well as a challenge-response validator to provide mutual authentication between a user and a website, email or other channel of communication.

BACKGROUND OF THE INVENTION

A current approach to authenticating individuals to electronic services over remote channels utilizes the equivalent of what is commonly known as the password portion of a login password and changes for every access. This approach is known as a one time password (OTP) solution. Current attempts to employ OTP solutions on mobile platforms, such as mobile phones, PDA's and the like are plagued by inherent weaknesses to the operating environment. For example, currently offered OTP solutions enable unauthorized persons to download viruses, spyware, etc. to mobile platforms that potentially compromise the secrets that are utilized within the OTP in much the same way as they do on personal computers. There is a present need for an OTP solution that overcomes such weaknesses.

SUMMARY OF THE INVENTION

It is a feature and advantage of the present invention to provide methods and systems for secure user authentication using OTP generation and validation techniques in which the shared secret for generating the OTP is not stored in the user's mobile device but the shared secret for generating the OTP is instead dynamically synthesized based on a PIN that activates the OTP generation and the personalized OTP data.

It is a further feature and advantage of the present invention to provide methods and systems for secure user authentication using OTP generation and validation techniques in which the client software has no knowledge of what the correct PIN should be and the only way to learn whether or not an OTP is correct is to submit it during user login, such that limiting the number of failed login attempts before the account is locked assures failure of a brute-force attack via the online channel.

It is another feature and advantage of the present invention to provide methods and systems for secure user authentication using OTP generation and validation techniques in which brute-force attacks to uncover the correct PIN for generating the correct OTP offline will also fail even if a hacker steals the user's mobile device and extracts the data inside for offline hacking, because there is nothing on the client that contains the PIN or encrypted by the PIN.

It is another feature and advantage of the present invention to provide methods and systems for secure user authentication using OTP generation and validation techniques in which OTP PIN change can be done completely on the server side, since there is no need for the client to know the PIN.

It is an additional feature and advantage of the present invention to provide methods and systems for secure user authentication using OTP generation and validation techniques which can be implemented in software, for example, for mobile phones, PDAs, PCs or with custom hardware OTP tokens.

It is a still further feature and advantage of the present invention to provide methods and systems for secure user authentication using OTP generation and validation techniques to defeat threats of phishing email and spoofed websites.

To achieve the stated and other features, advantages and objects, embodiments of the present invention employ computer hardware and software, including, without limitation, instructions embodied in program code encoded on machine readable medium, to provide methods and systems for secure user authentication using OTP generation and validation techniques in which the shared secret for generating the OTP is not stored in the user's mobile device but instead is dynamically synthesized based on a PIN that activates the OTP generation and the personalized OTP data. The client software has no knowledge of what the correct PIN should be and always generates a normal looking OTP based on whatever PIN is entered, and the only way to learn whether or not the OTP is correct is to submit it during user login, for example, to a financial institution web application such as online banking. By limiting the number of failed login attempts before the account is locked, brute-force attacks via the online channel will fail. Further, brute-force attacks to uncover the correct PIN for generating the correct OTP offline will also fail even if a hacker steals the user's mobile device and extracts the data inside for offline hacking, because there is nothing on the client that contains the PIN or encrypted by the PIN.

Additional objects, advantages and novel features of the invention will be set forth in part in the description which follows, and in part will become more apparent to those skilled in the art upon examination of the following, or may be learned from practice of the invention.

DETAILED DESCRIPTION

Figure 1:
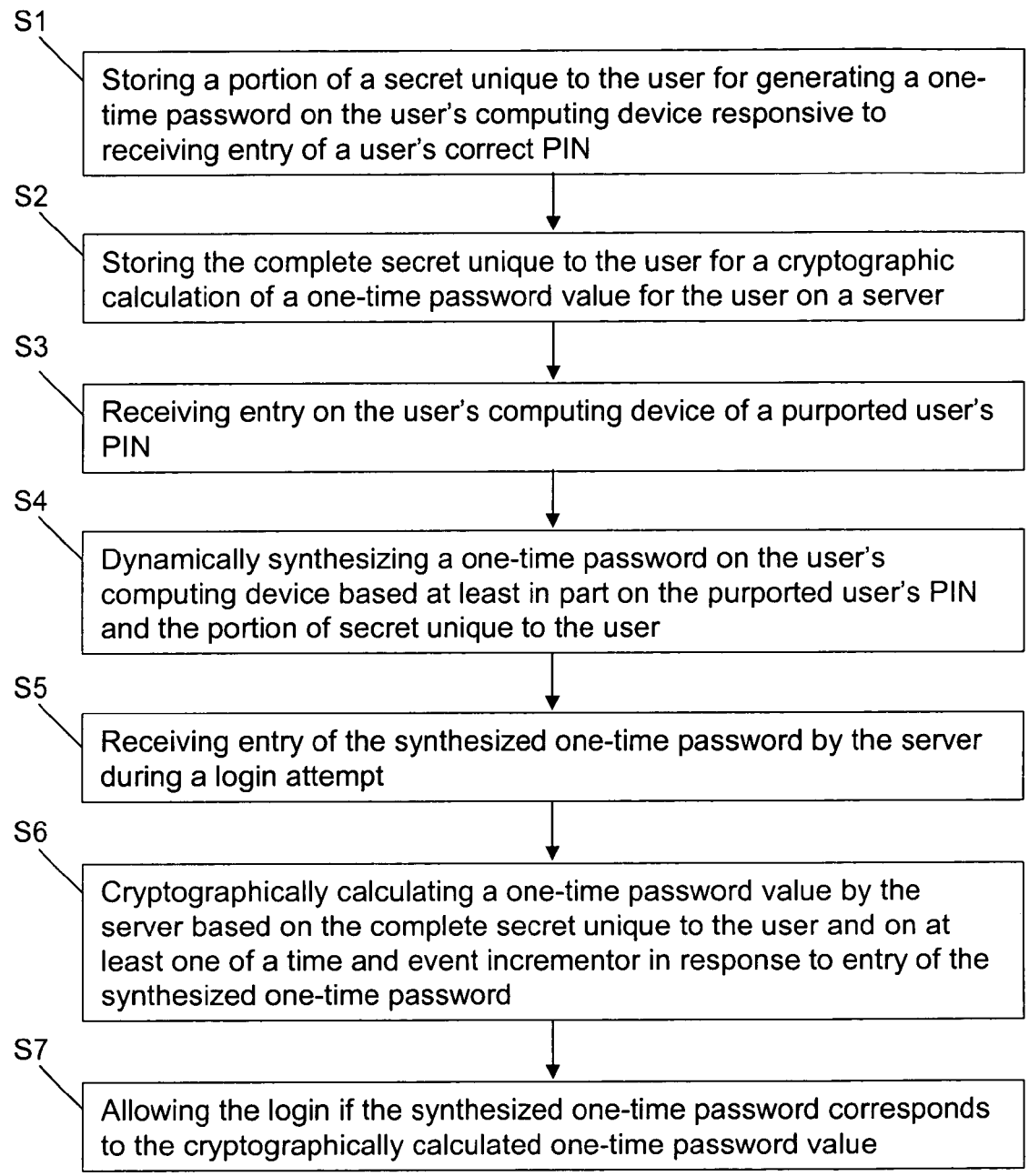
FIG. 1 is a flow chart that illustrates an example of the process of secure user authentication using a one-time password for embodiments of the invention.

Reference will now be made in detail to embodiments of the invention, one or more examples of which are illustrated in the accompanying drawings and in Appendices A through D hereof. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the invention.

Embodiments of the invention utilize an open standard for the OTP algorithm itself based, for example, on algorithms and standards such as those developed by the initiative for Open AuTHentication or OATH consortium. Unique aspects of embodiments of the invention add value, for example, via the manner in which secrets are distributed, identified and accessed within the actual operation of the solution. In other words, embodiments of the invention add value to the entire activation and usage process which provides a level of security above and beyond that which would normally be available in existing mobile platforms.

A solution provided by embodiments of the invention uses a novel technique that eliminates the need to store a complete shared secret on a user's mobile device, such as a mobile phone, for the OTP generation. Instead, the shared secret is generated dynamically every time the user uses the OTP application on the mobile phone with some type of PIN, and the PIN combined with some part of a secret unique to every user is stored on the phone. Thus, in embodiments of the invention, the shared secret is generated based on PIN input and the personalized OTP data, so that the mobile phone itself does not know or need to know the correct PIN.

Accordingly, if an unauthorized person who does not know the user's PIN gains possession of the user's mobile phone and enters an incorrect PIN using a brute-force technique starting, for example, with 0000 or the like, each time that person enters such a PIN, he or she will get an OTP value but will not know whether or not the OTP is correct. It would be necessary for such an unauthorized person to actually enter that OTP through some kind of login attempt, for example, to an online financial services application to actually find out whether or not that OTP is correct. Further, the financial institution providing the online financial services application has control on the server side over the number of unsuccessful login attempts a user is allowed to make. Thus, a brute-force technique would not work in trying to find a PIN or find a set secret for OTP generation according to embodiments of the invention.

For example, if three incorrect PINs are entered, the financial institution server identifies that and locks up the user's account. Specifically, assume, for example, that three successive incorrect PIN values are entered incorrectly into the OTP application on the user's mobile phone. Assume further that each time the mobile phone generates an OTP value it is in turn entered in an attempt to login to the online financial services application. The financial institution's server detects entry of the three successive incorrect OTP values and locks out the user's account until the user coordinates with customer service and identifies and proves his or her identity. It is to be understood, of course, that the number of times one can enter an incorrect OTP value before the account is locked is parameterized and configurable on the server side.

In embodiments of the invention, the OTP is generated on the user's device, such as the user's mobile phone, and thereafter the user enters that OTP into whatever device is employed in the channel by which the user accesses an application, such as a financial institution's application. The device can be, for example, a personal computer, a laptop computer, a PDA, a BLACKBERRY device, a phone, an ATM or the like. A key aspect of embodiments of the invention is that the mobile device does not contain the shared secret. Therefore, if an unauthorized person, for example, simply performs a memory dump on the user's mobile phone and replicates the mobile phone without knowledge of the user's PIN, the mobile phone is totally useless. While entry of an incorrect PIN on the mobile phone will generate some random, incorrect OTP value, the unauthorized person will not know whether or not the generated OTP value is incorrect until he or she attempts to use it to login to the financial institution application.

Many currently available commercial solutions have the complete shared secret and secret encryption PIN checksum on the user's mobile phone. In such solutions, a brute-force technique can be used by an unauthorized person to find the PIN that matches the checksum and enables such person to find and decrypt the encrypted secret in the phone for OTP generation. That is a serious weakness of such commercial solutions which is eliminated by the unique approach of embodiments of the invention. Other currently available commercial solutions simply store the shared secret on the user's mobile phone. In such solutions, the shared secret may be encrypted, but it is typically encrypted with another key that is also stored on the user's phone. That is likewise a serious weakness, because if the phone is compromised, all of that information can be extracted by an unauthorized person who then has sufficient information to replicate the user's OTP environment.

An important aspect of embodiments of the invention is implementation of a combined event-time windowing solution, as well as a number of other different counter options, within the OTP solution. The OATH algorithm itself primarily focuses on what is referred to as an event based count or increment. There is a shared secret and a counter, and the counter increments and changes the OTP values that are being generated. In embodiments of the invention, the shared secret is a cryptogram or a key for a cryptographic calculation which is stored on the server side, but not on the client side. The shared secret on the client side is generated in the client for OTP generation when the user enters the correct PIN on the client side. Once the OTP generation is complete, the shared secret on the client side is destroyed. Thus, embodiments of the invention generate the shared secret in the client as opposed to simply decrypting the shared secret in the client.

In an implementation of embodiments of the invention, since the shared secret is a composite value, it is held on the server side and is generated on the client side by the value created during client side activation in conjunction with the PIN entered by the user when the client application is activated for OTP generation. On the other hand, the OATH algorithm has the shared secret on both the client and the server. The OATH algorithm has basically two components, one of which is a static component of the secret which does not change. For example, in a hard token that uses the OATH algorithm, there is a static component which is a very long key, such as 40 bytes, and a moving component which is a counter. Embodiments of the invention differ from the OATH algorithm, for example, in respect to the moving part and the static part of the secrets in that those aspects are not simply stored on the user's mobile phone so that unauthorized persons can easily take the user's phone and duplicate it in order to compromise the user's OTP. As far as the OATH algorithm is concerned, the two inputs, i.e., the moving factor and the static factor, look the same and it does not matter where those inputs come from.

The PIN in an implementation of embodiments of the invention is managed on the server side. For example, when a bank customer registers for online banking services using the one time password implementation for embodiments of the invention, the customer can create a PIN for that one time value solution. Creation of such PIN is performed by the customer online interacting with the server. Thus, the server on the backend knows the particular PIN value. Thereafter, when the customer downloads the software for embodiments of the invention to the customer's mobile phone and activates it and uses his or her PIN at that point in time, the PIN is used in creating the secret interactively, but the PIN value is not retained on customer's the phone. Instead, the PIN is retained only at the server so that the server knows that when it receives an OTP value in the password field, it can then validate the OTP value by recreating the same secret using the PIN value previously identified to the server. This implementation utilizes what is referred to as a soft PIN approach, as opposed to the hard PIN approach in currently available solutions in which the PIN actually resides on the mobile device, which is a security risk.

OTP algorithms can have a moving portion, which is event based and simply counting or incrementing, or that employs a clock that can be synchronized between the client device being used to generate the OTP value and the backend server. In the latter case, the actual time value can be used as the moving factor in place of the event counter instead of a counter simply incrementing. Those are standard definitions of OTP use and either the event based aspect utilizing some type of counter or the time based aspect can be used.

In the event based aspect, the counter (or incrementor) increments every time a user requests a new OTP value. Thus, every time a user performs an OTP, the counter increments. An area of concern in the use of time synchronization with mobile devices is a lack of precision from one mobile device to another. In other words, if the clock on the user's mobile phone is not accurate, it may be unlikely that it is synchronized with (or within an acceptable window of tolerance) with the back end server. Therefore, if time based increments are used as the basis of creating randomness in OTP values, it may not be possible for the user's mobile phone to match up with what the server thinks is the time, so the OTP value would fail to validate. In other words, if the user's mobile phone is, for example, five minutes different from what the server thinks the time is, it may be outside the acceptable (i.e., recognizable) window of tolerance.

A consideration that may dictate a preference for utilizing a time based value rather than an event based value is that once an event is created, it is valid until used and the next event occurs. Accordingly, if an unauthorized person captures that value, he or she can reuse it at some later point in time if the user does not make contact with the system. However, with a time based value, there is a moving window on the back end server as time progresses, so that when the user generates an OTP value based on a moving factor of time, it is only valid until the window moves beyond the particular time frame after which it automatically expires. This automatic aging that occurs when a time based value is used makes the solution more secure.

In order to take advantage of the use of time based values in this environment in which there are unknown differences between the client side device and the server with which the user attempts to communicate, an aspect of embodiments of the invention makes the time window greater but also incorporates an event based component. Thus, while the server side window is much larger, because both factors are utilized, a user has a great deal of flexibility in using the system. In other words, a situation can arise if there is a large time step and no event counter in which virtually every time the user presses the key on the client device to create a new OTP value, he or she can end up with the same value because the time window has not changed. However, this situation cannot arise when both factors are used in the solution for embodiments of the invention.

According to embodiments of the invention, instead of being purely time based or purely event based, the moving factor is both time and event based. Thus, if the time increment is 30 minutes, between, for example, 1:00 PM and 1:30 PM according to the clock on the user's mobile phone, the value of 1:00 PM will be used for all OTP values generated. Thereafter, for example, at 1:30 PM, the user's mobile phone increments and begins using 1:30 PM for generation of OTP values. However, if the user performs, for example, a couple of transactions between 1:00 PM and 1:30 PM, once the user uses an OTP value, the next value will be different because the event counter changes even though the time window has not expired.

In implementations of the invention utilizing the time and event based combination, every time the user asks for an OTP value, the counter also increments, so when the user asks, for example, for an OTP at 1:00 PM and the counter is five, an embodiment of the invention takes 1:00 PM and five as the moving factors and creates an OTP value. Thereafter, if the user asks for another OTP value at 1:02 PM, the embodiment again takes 1:00 PM, but the counter is six, so it creates an OTP value based on that moving factor value which is different. Thus, embodiments of the invention provide the ability to control expiry of outstanding OTP's but in a manner in which the greater variability of the various clocks is accommodated.

Two significant aspects of implementations of embodiments of the invention involve, on the one hand, providing greater security to the solution by removing the essential secret for OTP generation from the client platform and on the other hand, addressing concerns about time variability on mobile platforms by providing an implementation that combines the event and time characteristics of the moving component of the solution. In the first aspect the OTP shared secret is not stored on the client side but only on the server, which cannot be done by currently available solutions. Further, in implementations of the invention, the PIN itself is used as part of the algorithm process, while currently available solutions use the PIN simply to unlock an application or actually use the PIN internally, for example, to decrypt the secret that is stored in the phone. As previously noted, an unauthorized person can take a user's mobile phone and decrypt it with a brute-force technique because all the information needed is stored on the phone including the checksum to verify whether the PIN is correct.

As also previously noted, a unique feature of embodiments of the invention is that there is nothing to enter to decrypt on the client side. An unauthorized user can enter anything as a PIN and an OTP will be generated, but he or she cannot know if it is a valid or invalid OTP. Another unique feature is that embodiments of the invention provide a solution to the clock synchronization issues on most of mobile phones.

Another disadvantage of currently available time based commercial solutions is that an unauthorized person in possession of a user's mobile phone can adjust the time, such as setting it to the next day at the same time, and then generate an OTP, copy it down, and reset the mobile phone back to the current time so that the user does not notice. Thus, the unauthorized user has a time window in the next day to use that OTP to login to the user's account without alerting the user because it is all time based and the clock is not locked and can easily be adjusted. However, because embodiments of the invention utilize a combination of both event and time, even if an unauthorized person changes the clock, the event is different (i.e., when an OTP is generated, the event counter increases) so when an OTP is requested at a later time, since the event counter changes, the OTP is different. Thus, it is useless for an unauthorized person to attempt to adjust the clock.

An additional aspect of embodiments of the invention includes anti-phishing, which is also a method that can be used to support mutual authentication, and which adds, for example, a "Web Site Verifier" function to the OTP client application on the mobile phone and a "Challenge Web Site" button to the login page that will allow the customer to check if the server is genuine before entering his or her OTP. Thus, a spoofed web site from a phishing scam will not be able to obtain a user's OTP without answering the challenge correctly. In the anti-phishing aspect, the web site verifier function uses a standard challenge-response technique to authenticate the web site, with the customer device generating a challenge and the web server producing a response to prove that it knows the customer's OTP shared secret. In order to safeguard the shared secret from reverse engineering, the technique used for generating the response is a truncated one-way hash function.

In the anti-phishing aspect of embodiments of the invention, whenever the user is not sure if the web site is genuine, the user can enter only his login ID and click on the "Challenge Web Site" button at the login page, and the web site presents a screen/pop up box that allows the user to enter a challenge code generated by his OTP token's "Web Site Verifier". The user uses his mobile phone to select the "Web Site Verifier" function in his OTP client application to generate a challenge code. In order to avoid replay attacks, for example, a random number is generated by the "Web Site Verifier" function of the OTP client software as the challenge code. The user enters the generated challenge code from his mobile phone OTP client software into the web site's challenge field and clicks "Submit Challenge", and the Web site displays a response code corresponding to the submitted challenge. The user then enters the response code from the web server into his mobile phone's "Web Site Verifier", and the "Web Site Verifier" function on the mobile phone OTP client software returns a "Yes/No" answer to let the user know if the web site is genuine or not.

In the anti-phishing aspect, the "Challenge web site" button can be placed on other web pages after the initial login page to allow the user to challenge the web site at anytime. This is useful, for example, for a user who does not perform the challenge during login and later decides to check before performing a sensitive transaction such as external money transfer. This is also useful, for example, if the user receives an update code from the web site during a session (see, e.g., discussion of the policy driven OTP aspect below for how the update code works) and wishes to make sure the web site is genuine before entering the update code to his OTP device. A feature of the anti-phishing aspect is, for example, combined usage for mutual authentication in which, with the web site verifier, the user can authenticate the web site before giving out any sensitive data such as an OTP that is susceptible to phishing attack if the OTP algorithm is pure event-based. On the other hand, the website can authenticate the user based on the user's OTP. In this way, two-way/mutual authentication can be achieved.

Another aspect of the invention utilizes embodiments of the invention for defeating phishing email, which involves, for example, generating a one-time code using the knowledge of the user's OTP shared secret in the OTP server and including that one-time code in all legitimate email communications from the financial institution to its customers with the financial institution's mobile OTP. A customer who receives an email from the financial institution can enter that code into the mobile OTP application to verify that the email came from the financial institution. Since the phishing email attackers do not know the shared secret of the user, they cannot generate the correct code to fake a financial institution email.

The anti-phishing email aspect of embodiments of the invention uses an arbitrary challenge code generated for every email that a financial institution sends out to its clients. This challenge code, also referred to as an e-code, can be highlighted with bold font or embedded in graphics or presented in some other fashion designed to catch the user's attention when it is included in the email. Inside the email there is, for example, a URL link that is personalized for the particular user, so if the user likes the email contents and is interested in the promotion, the user can click on the URL link and go to a website.

The e-code that is included in the email can be used with the OTP token previously described herein. The user can enter the e-code as a challenge, and a response, also referred as an e-response code, is generated off-line completely on the user's mobile device. When the user clicks on the URL link in the email, the user goes to the website, and the website displays a response code. If the response code displayed on the website matches the e-response code generated by the user's OTP device, then the user knows the website is good. Otherwise, it is probably a spoofed website.

Assume that an unauthorized third party intercepts the user's email and goes to the website first and gets the response code and replays it in a spoofed site. An embodiment of the invention employs a time-based challenge-response algorithm so that the response code is different, for example, every "x" minutes. For instance, if the time "x" is set to 60 minutes or 60 seconds, the response code changes every hour or every minute. So, assuming the time "x" is set to 60 minutes, if an unauthorized third party harvests a response code, the e-response code changes after an hour and defeats the spoofed site thereafter.

The time-based challenge-response algorithm for embodiments of the invention eliminates 90% of such attacks. However, there is still a possibility that someone could try to defeat the time-based challenge-response mechanism by setting up an automated proxy-type spoofed website by which whatever the authentic website presents is simply projected to the user for the user to see. Thus, when the user enters the challenge code, it is simply forwarded to the authentic site, and the authentic site would generally respond.

In order to defeat such an automated proxy type spoofed website, when the e-response code is presented, embodiments of the invention place the e-response code in some type of a Java display-rendering applet that is very difficult for an unauthorized party to cause to be automatically harvested and re-displayed in a spoof site. In other words, it becomes virtually impossible for the unauthorized party in real time to simply take the output and place it back in the spoof site to fool the user. Thus, according to the anti-phishing email aspect of the invention, when the user receives the correct response, he or she can have a high level of confidence that the website is real and that he or she can proceed to login safely.

On the other hand, if the user still has doubts about the authenticity of the website, the anti-phishing email aspect for embodiments of the invention employs another mechanism previously described herein. This mechanism is the challenge-the-website function using a random challenge code, also referred to as a w-code. The OTP token for embodiments of the invention has another function for the challenge-the-web site type mutual authentication. Thus, the user selects the challenge-the-web site function and generates a challenge code. The financial institution's website has a challenge-the-website button on which the user clicks and transitions to a webpage that allows the user to enter the challenge code known as the w-code. The user then clicks on "submit" and receives a response. If the response matches the challengethe-website response generated by the user's OTP device, the user knows that the website is authentic. The user can use this mechanism at any time during the session to prevent an unauthorized party's attempt to hijack the user's session.

Turning again to the verify function for the anti-phishing email aspect of embodiments of the invention, when the user clicks on the link in the email, it is not necessary for the user to enter a user ID because the link in the email is personalized for the user. In other words, the link itself has parameters that contain both the e-code and, for example, a hash of the user ID or something that uniquely identifies the user to the financial institution. The financial institution knows what the user's e-code is and generates a corresponding response. The user sees the e-code in the email and enters the e-code into the user's OTP token and generates a response. If that response matches the one displayed to the user on the website, then the website is authentic. That is true even if a pass-through proxytype attack is used, because when the financial institution presents its response to the user, it is displayed using technology employed to make it extremely difficult for someone to harvest the e-response code and replay it back to the user.

Turning again to the challenge function for the anti-phishing email aspect of embodiments of the invention, as previously described herein, when a user uses his or her OTP token to connect directly to his or her financial institution website (as opposed to checking on email), the user normally enters his or her user ID and then clicks on the challenge-the-website function and verifies that the site is authentic before entering his or her one-time password. Thus, the challenge-response algorithm for embodiments of the invention deployed in the user's OTP token allows the user to perform a two-way user authentication. Not only does the website verify that the user is authentic, but the user also verifies that the website is authentic before he or she proceeds with entering anything. Further, as previously discussed, the complete OTP shared secret is only on the server side. When the user generates a challenge and response, he or she must still enter his or her PIN to generate the OTP shared secret on the fly and generate the correct response.

A further aspect of embodiments of the invention includes policy driven OTP that relates to the generation of OTP values. The ability to update the OTP shared secret, algorithm type, and security policy by a financial institution, such as a bank, at will which provides an excellent way to reduce the possibility of compromised OTP devices. This is especially true for software based OTP implementation that runs on user devices such as mobile phones, PDAs, and PCs. Hackers may use viruses, malware, keyloggers, etc. to monitor and export information from the device for illegal activities. In the case of static passwords, the security policy imposes password composition rules and periodic password change to reduce the possibility of password compromise. However, it adds burdens to the user to use difficult-to-remember passwords and to change them regularly. This may be acceptable for corporate employees, but it may not be acceptable for individual bank customers. The policy driven OTP system for embodiments of the invention solves this problem with an innovative solution that alters the OTP without requiring the user to change his OTP PIN.

In the policy driven OTP aspect of embodiments of the invention, an "Update" function is added to the OTP client software on the mobile phone to support modification of OTP shared secret components and security policy, such as which OTP algorithm to use via an update code. The financial institution can initiate an OTP policy change from the OTP management system and issue an update to any user at any time based on business rules, security policy change, or threat detections. For example, the financial institution can push an update to the user in every 20 good logons, every month, when the user account has many bad login attempts prior to the successful login, when the financial institution decides to switch from one OTP algorithm to another, etc. The update code can be delivered to the user during a logon session (e.g. a user has login successfully) or via an alternative channel (e.g. email, PIN mailer, etc.). Note that the update code is used incrementally to modify the existing shared secret components and security policy of the OTP client software. This makes intercepting the update code useless to the attacker because it needs to combine with the existing shared secret components and PIN to generate the new shared secret.

In the policy driven OTP aspect of embodiments of the invention, the financial institution can manage the OTP tokens as if managing regular static passwords. For examples, the financial institution can enforce regular password change without requiring the user to change his OTP PIN. The OTP token can be "expired" by the financial institution at anytime by issuing an update code to that token. Changing the underlying shared secret and/or components of the OTP is like changing a static password. To the user, it is as simple as entering the received update code. The beauty of this approach is that the user can still use the same old PIN to generate OTP after the update, but the generated OTP will be totally different because the shared secret, parameters, and/or OTP algorithm underneath are no longer the same. In addition, if a particular OTP algorithm is no longer secure or it has performance issues, the financial institution can issue an update code to switch the characteristics of the OTP client software to use a different algorithm or OTP factor combination. In this way, the financial institution can control everything related to the OTP client software/token from the OTP management server using the update code without having to upgrade the OTP client software. In addition, mutual authentication can be performed between user and website by combining the anti-phishing aspect and the policy driven OTP aspect of embodiments of the invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for secure user authentication using a one-time password, comprising:

storing a portion of a secret unique to the user for generating a client-side version of a correct one-time password value on a first client-side computing device responsive to receiving entry of a user's correct PIN value, said client-side version of the correct one-time password value being based at least in part on the entered PIN value and at least in part on both a client-side time incrementor and a client-side event incrementor, wherein the portion of the secret unique to the user stored on the first client-side computing device excludes the user's correct PIN value on which generation of the client-side version of the correct one-time password value is based at least in part and wherein a putative one-time password value is always generated in response to entry of any purported PIN value of the user on the first client-side computing device;

storing the complete secret unique to the user for a cryptographic calculation of a server-side version of the correct one-time password value for the user on a server computer, wherein the complete secret unique to the user stored on the server computer comprises the user's correct PIN value and an algorithm for calculating the server-side version of the correct one-time password value based at least in part on the user's correct PIN value and at least in part on both a server-side time incrementor and a server-side event incrementor that are synchronized, respectively, with the client-side time incrementor and the client-side event incrementor;

receiving entry on the first client-side computing device of a purported PIN value of the user;

dynamically synthesizing a putative one-time password value on the first client-side computing device based at least in part on the purported PIN value of the user, the portion of the secret unique to the user stored on the first client-side computing device that excludes the user's correct PIN value, and both the client-side time incrementor and the client-side event incrementor;

receiving entry of the putative one-time password by the server computer during a login attempt from a second client-side computer;

cryptographically calculating the server-side version of the correct one-time password value by the server computer based at least in part on the complete secret unique to the user and on both the time incrementor and the event incrementor in response to receiving entry of the putative one-time password value; and allowing the login when the putative one-time password corresponds to the cryptographically calculated server-side version of the correct one-time password value.

2. A system for secure user authentication using a one-time password, comprising:

a first client-side computing device having a processor coupled to memory, the first client-side computing device processor being programmed for:

storing a portion of a secret unique to the user for generating a client-side version of a correct one-time password value on the first client-side computing device responsive to receiving entry of a user's correct PIN value, said client-side version of the correct one-time password value being based at least in part on the entered PIN value and at least in part on both a client-side time incrementor and a client-side event incrementor, wherein the portion of the secret unique to the user stored on the first client-side computing device excludes the user's correct PIN value on which generation of the client-side version of the correct one-time password value is based at least in part, and wherein a putative one-time password value is always generated in response to entry of any purported PIN value of the user on the first client-side computing device;

a server computer having a processor coupled to memory, the server computer processor being programmed for:

storing the complete secret unique to the user for a cryptographic calculation of a server-side version of the correct one-time password value for the user on the server computer, wherein the complete secret unique to the user stored on the server computer comprises the user's correct PIN value and a key for the cryptographic calculation of the server-side version of the correct one-time password value based at least in part on both a server-side time incrementor and a server-side event incrementor that are synchronized, respectively, with the client-side time incrementor and the client-side event incrementor;

the first client-side computing device process being further programmed for:

receiving entry on the first client-side computing device of a purported PIN value of the user;

dynamically synthesizing a putative one-time password value on the first client-side computing device based at least in part on the purported PIN value of the user, the portion of the secret unique to the user stored on the first client-side computing device that excludes the user's correct PIN value, and both the client-side time incrementor and the client-side event incrementor;

the server computer processor being further programmed for:

receiving entry of the putative one-time password by the server computer during a login attempt from a second client-side computer;

cryptographically calculating the server-side version of the correct one-time password value by the server computer based at least in part on the complete secret unique to the user and on both the time incrementor and the event incrementor in response to receiving entry of the putative one-time password value; and allowing the login if when the putative one-time password corresponds to the cryptographically calculated server-side version of the correct one-time password value.

* * * * *